(12) United States Patent
Mihara (10) Patent No.: US 6,323,892 B1
(45) Date of Patent: Nov. 27, 2001

(54) DISPLAY AND CAMERA DEVICE FOR VIDEOPHONE AND VIDEOPHONE APPARATUS

(75) Inventor: Takashi Mihara, Iruma (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/363,217

(22) Filed: Jul. 29, 1999

(30) Foreign Application Priority Data

Aug. 4, 1998 (JP) ................................................. 10-220516

(51) Int. Cl.[7] ....................................................... H04N 7/14
(52) U.S. Cl. ..................................... 348/14.01; 348/14.08; 348/14.16
(58) Field of Search ................................... 348/14, 15, 20, 348/335, 340; 404/235; 359/364, 833, 868, 869

(56) References Cited

U.S. PATENT DOCUMENTS

| 5,317,405 | * | 5/1994 | Kuriki et al. | 348/20 |
| 5,730,518 | * | 3/1998 | Kashima et al. | 362/31 |
| 5,815,196 | * | 9/1998 | Alshawi | 704/235 |

FOREIGN PATENT DOCUMENTS

| 402194786A | * | 8/1990 | (JP) | H04N/7/14 |
| 404310053A | * | 11/1992 | (JP) | H04M/11/06 |
| 405064183A | * | 3/1993 | (JP) | H04N/7/14 |
| 405292491A | * | 11/1993 | (JP) | H04N/7/14 |
| 6-22308 | | 1/1994 | (JP) . | |
| 406133308A | * | 5/1994 | (JP) | H04N/7/14 |
| 408140143A | * | 5/1996 | (JP) | H04Q/7/38 |
| 408149444A | * | 6/1996 | (JP) | H04N/7/15 |
| 4083400520A | * | 12/1996 | (JP) | H04N/7/14 |
| 9-166760 | | 6/1997 | (JP) . | |
| 410191288A | * | 7/1998 | (JP) | H04N/7/14 |
| 63-252084 | | 10/1998 | (JP) . | |

* cited by examiner

*Primary Examiner*—Curtis Kuntz
*Assistant Examiner*—Melur Ramakrishnaiah
(74) *Attorney, Agent, or Firm*—Frishauf, Holtz, Goodman, Langer & Chick, P.C.

(57) ABSTRACT

A display and camera device for a videophone comprises a liquid crystal display for displaying a picture, a camera such as a CCD sensor or a CMOS sensor, a free-form surface prism, and a prism for guiding light to the camera. The free-form surface prism has a concave reflector for optically enlarging a picture displayed on the display. A beam splitter is provided on a bonded surface between the free-form surface prism and the prism. The beam splitter is designed to reflect some of light beams from the display toward the reflector and transmit some of light beams from the reflector. A camera-system optical path extending from the camera is aligned with a display-system optical path extending from the display within the free-form surface prism and the outside space.

29 Claims, 6 Drawing Sheets

DISPLAY AND CAMERA DEVICE FOR VIDEOPHONE AND VIDEOPHONE APPARATUS

BACKGROUND OF THE INVENTION

The present invention relates to a display and camera device for a videophone, and a videophone apparatus.

A videophone is a system for bidirectionally transmitting moving pictures and speech of minimum quality over conventional telephone lines. Unlike conventional speech and data communications systems, the videophone allows one party to look the other party in the face and see expressions thereon, and a large amount of information can be transmitted to each party. The videophone is thus expected to be used both for business and at home. In an aging society, talking with one party while looking him or her in the face and seeing the expression thereon will become more and more important for checking his or her condition.

Bidirectional transmission of moving pictures demands a high transfer rate for the conventional telephone lines. However, a moving-picture compression technique having a high compression ratio, which has been improved by digitization of pictures and advances of semiconductor technology, is going to enable a videoconference apparatus to be utilized at average homes over home telephone lines. For this reason, a videoconference system and a stand alone apparatus mounted on a computer, have been developed and are now on sale as products.

In the early stages of a videoconference system, a display device using liquid crystal and a camera using an image pickup device are arranged separately from each other. This arrangement causes a problem of a so-called noncoincidence of lines of sight in which the eyes (line of sight) on the device side do not coincide with those (line of sight) on the display device side. Usually one talks while looking the other party in the face or eyes. A coincidence of lines of sight allows a speaker to speak anytime while looking the other party in the eyes without gazing into the party's eyes for a long time. The speaker determines where to turn his or her eyes according to the importance and contents of conversation. In a noncoincidence of lines of sight, however, the speaker cannot look the party in the eyes. To turn the speaker's gaze on the party's eyes, the speaker has to look at the center of the camera and, in this case, he or she cannot see the party in the display device.

A current videophone used alone or attached to a computer includes a camera and a display provided apart from each other and thus the lines of sight do not coincide. In actuality, an image is not so sharp that the level of eyes cannot be recognized clearly at a 28.8-Kbps communication speed used for the current home telephones, and a user does not care about the noncoincidence of lines of sight; however, this problem becomes serious as the communication speed increases.

Some high-quality videophones which have improved in a coincidence of lines of sight, are already proposed.

For example, Jpn. Pat. Appln. KOKAI Publication No. 63-252084 discloses a videophone in which a beam splitter such as a translucent mirror for reflecting light from a CRT for displaying a picture is provided on an optical path of a camera for taking a picture of a speaker. The beam splitter is so arranged that the optical axis of the reflected light is aligned with that of the camera, and a coincidence of lines of sight is attained.

Since, however, this arrangement necessitates many times as large capacity as that of a conventional television, it is difficult to introduce for home use. A home videophone should not be designed larger than a conventional telephone set.

Jpn. Pat. Appln. KOKAI Publication No. 6-22308 discloses an apparatus in which an optical path extending from a display and an optical path extending toward a camera are deflected by means of a lenticular lens (small-sized prism array) and a light-shield slit. The optical path extending from the display, which goes out of the apparatus after it is deflected, and the optical path extending toward the camera, which is deflected after it enters the apparatus, coincide with each other; thus, a coincidence of lines of sight is achieved.

This apparatus is however difficult to miniaturize since it should be made large to some extent for keeping sufficient characteristics. Probably the characteristics will be degraded due to the light-shield slit.

Recent electronic devices are increased in packing density and their capacities for processing speech and picture signals are improving dramatically. A large scale computer, which was formerly very expensive, is now integrated on a silicon chip 1 cm square and is now much cheaper. It is a small-sized LCD that is the most suitable for the display. Since an LCD not more than 1 inch square has a small substrate, some LCDs are priced very cheaply. On the other hand, a large-sized display is still expensive.

Recently a digital still camera and a digital camcorder have been becoming popular and accordingly a small-sized camera sensor with a lens is decreasing in price. In particular, a CMOS sensor appears in place of a CCD requiring three chips or more. This suggests that a peripheral device, such as an amplifier and an AD converter, is simply integrated and miniaturized.

BRIEF SUMMARY OF THE INVENTION

An object of the present invention is to provide a small-sized, inexpensive display and camera device capable of picking up an image of a user from the front.

Another object of the present invention is to provide a small-sized videophone apparatus capable of achieving a coincidence of lines of sight during a phone conversation.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 5A and 5B illustrate a videophone apparatus according to a third embodiment of the present invention and, more specifically.

FIGS. 6A and 6B illustrate a videophone apparatus according to a fourth embodiment of the present invention and, more specifically.

FIGS. 7A and 7B illustrate a videophone apparatus according to a fifth embodiment of the present invention and, more specifically.

FIGS. 11A to 11C illustrate a system for transmitting a received picture of a videophone apparatus according to a ninth embodiment of the present invention to a home television and a personal computer and, more specifically.

DETAILED DESCRIPTION OF THE INVENTION

Embodiments of the present invention will now be described with reference to the accompanying drawings.

[First Embodiment]

Figure 1:
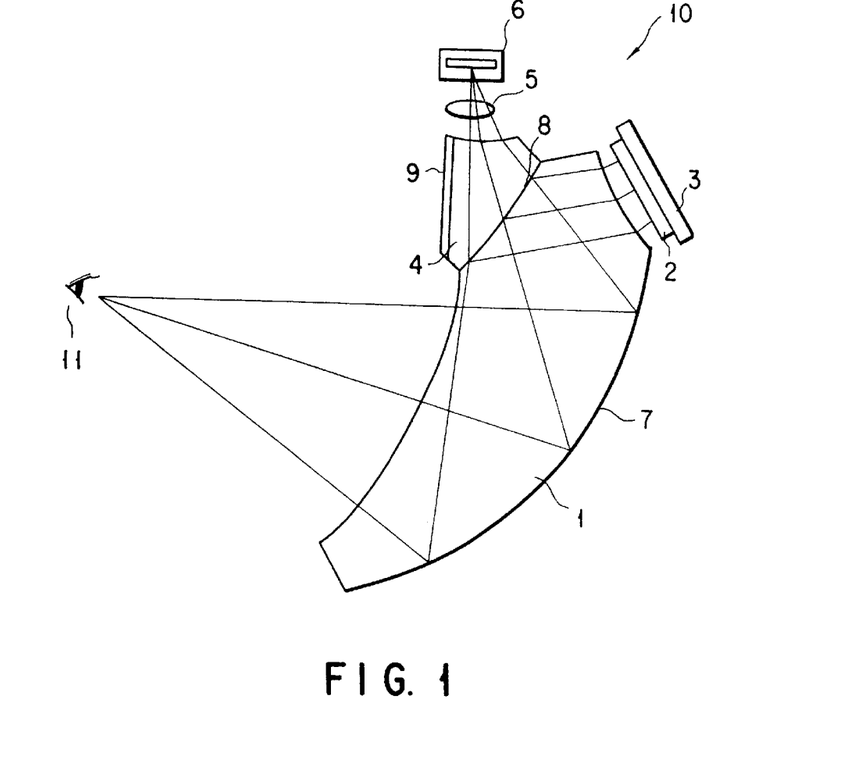
FIG. 1 shows an optical system of a videoconference apparatus (videophone apparatus) according to a first embodiment of the present invention.

FIG. 1 shows an optical system of a video-conference apparatus (videophone apparatus) according to a first embodiment of the present invention. The videophone apparatus includes a display and camera device, which has optical system 10 comprising a free-form surface prism 1, a display 2, such as an LCD (Liquid Crystal Device), for displaying a picture, a backlight 3 for illuminating the display 2, a camera 6 such as a CCD sensor and a CMOS sensor, a prism 4 for guiding light to the camera 6, and a lens 5 arranged between the prism 4 and camera 6.

The term "free-form surface" means a curved surface which is neither a plane nor part of a sphere, and the term "free-form surface prism" means a prism having a free-form surface on at least one surface. An optical element with a free-form surface is described in, for example, Jpn. Pat. Appln. KOKAI Publication No. 9-166760.

The free-form surface prism 1 includes a concave reflector 7 for optically enlarging a picture displayed on the display 2 by optical power. The surface of the reflector 7 is favorably coated with a metal film or the like.

A beam splitter 8 is provided on the bonded surface between the free-form surface prism 1 and prism 4 to reflect some of light beams from the display 2 toward the reflector 7 and transmit some of light beams reflected by the reflector 7.

The display 2, backlight 3, beam splitter 8 and reflector 7 constitute a display system, while the camera 6, lens 5, prism 4, beam splitter 8 and reflector 7 constitute a camera system.

The optical axes or optical paths of the display and camera systems differ from each other within a range from the display 2 and camera 6 to the beam splitter 8, but they coincide with each other after the beam splitter 8. More specifically, the optical path of light arrived at the camera 6 coincides with that of light emitted from the display 2 within the free-form surface prism 1 and its outside space. In other words, the beam splitter 8 splits one optical path into a display-system optical path formed near the display 2 and a camera-system optical path formed near the camera 6.

A light-shield (light-absorption) layer 9 is formed on the prism 4 to satisfactorily absorb a leakage of the light which is projected from the display 2 and is transmitting the beam splitter 8. Actually, an element other than the optical path is shielded against stray light; however, FIG. 1 shows only the light-shield layer 9 against leakage light which is considered to be a serious problem.

The camera system may additionally comprise an infrared filter or a low-pass filter if necessary. Instead of the infrared filter, the same function may be added to the prism 4.

Figures 2, 4:
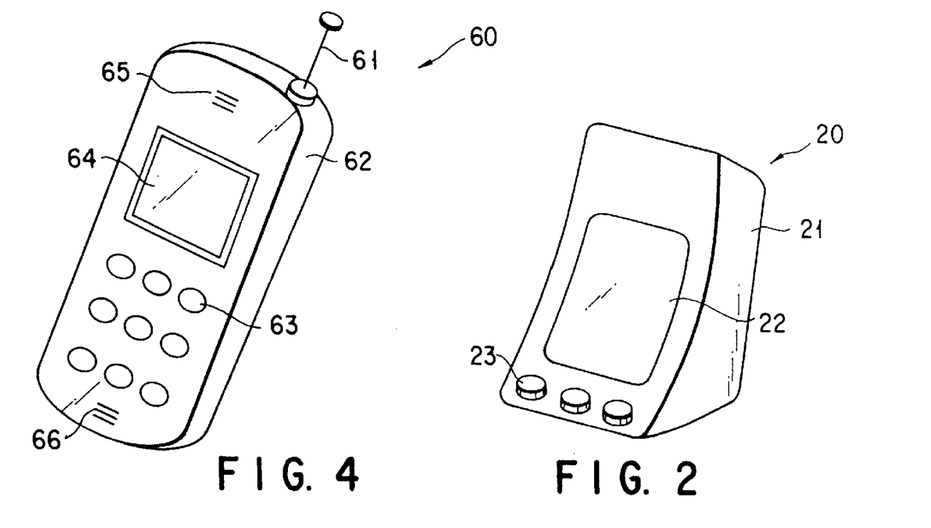
FIG. 2 illustrates a videoconference apparatus including the optical system shown in FIG. 1.
FIG. 4 illustrates an outward appearance of a videophone apparatus according to a second embodiment of the present invention.

FIG. 2 illustrates a videoconference apparatus 20 including the optical system shown in FIG. 1. The apparatus 20 has a case 21 for encasing the optical system therein, and a display window 22 and an operation button 23 both provided on the case 21. The free-form surface prism 1 shown in FIG. 1 is arranged behind the display window 22.

In FIG. 1, the light beams of a picture (usually a color picture) displayed on the display 2 are incident upon the free-form surface prism 1 without almost any loss, and some of the light beams are reflected by the beam splitter 8 and then by the reflector 7. After that, the light beams exit from the prism 1 to form an image in space. The surface of the prism 1, which is opposed to the display 2, and the beam splitter 8 are curved, and they enlarge an image of the display 2 and project it on the reflector 7 in association with each other. The reflector 7 is also curved and optically enlarges the image projected thereon. As a result, an about-1-inch screen of the display 2 is enlarged and the image is observed by a user 11.

The light beams incident upon the free-form surface prism 1 from the user 11, are reflected by the reflector 7. Then, some of the light beams pass through the beam splitter 8, their aberrations are corrected by the prism 4, and an image is formed on the light-receiving surface of the camera 6 by means of the lens 5. A picture of the user 11 is therefore picked up by the camera 6.

As is evident from the above, the optical paths of the display and camera systems coincide with each other between the beam splitter 8 and the user 11. In other words, a coincidence of lines of sight is completely achieved to allow a natural conversation.

Since the beam splitter 8 splits the optical path of the display system and enlarges an image on the display 2, the user 11 can see a relatively large image though the display 2 is small in size.

The functions of splitting the optical path of the display system, enlarging the image of the display system, separating the display and camera systems from each other, and correcting an aberration of the camera system are all provided integrally with the free-form surface prism 1 as one component. The prism 1 can be produced relatively thin and thus the videophone apparatus can be decreased in size and weight.

Figure 3:
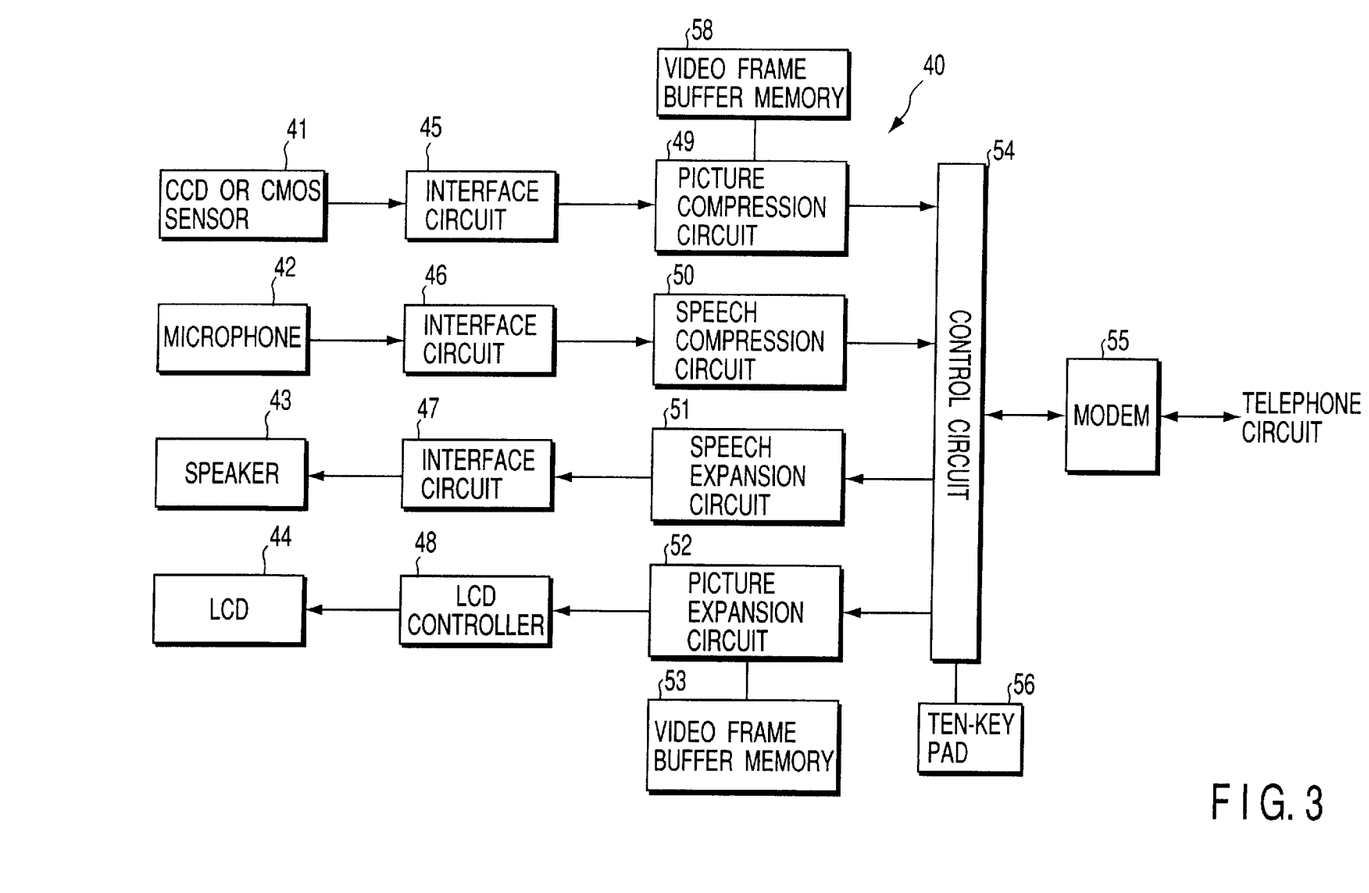
FIG. 3 shows a constitution of the videophone apparatus according to the first embodiment of the present invention.

FIG. 3 shows a constitution of the videophone apparatus described above. The videophone apparatus comprises a CCD or CMOS sensor 41, an interface circuit 45 such as an amplifier and an ADC, and a picture compression circuit 49, for inputting a picture; a microphone 42, an interface circuit 46 such as an amplifier and an ADC, and a speech compression circuit or DSP 50, for inputting speech; a picture expansion circuit 52, an LCD controller 48, and an LCD 44, for outputting a picture; a speech expansion circuit 51, an interface circuit 47 such as an amplifier, and a speaker 43, for outputting speech. The videophone apparatus may further comprises a video frame buffer memory 58 for compressing and expanding a picture and a video frame buffer memory 53 for temporarily storing a picture. A control circuit 54 for controlling whole of the circuits is connected to a telephone circuit through a modem 55 and controlled by a ten-key pad 56. A bus line is used for each data line when necessary. Some of these circuits are mounted on a semiconductor chip as a system-on-chip.

DCT (Discrete Cosine Transform), which is a standard system, and motion compensative interframe prediction are used for picture compression. The DCT is a very efficient system and has recently been used normally for still and moving pictures. Not only the still pictures but also the moving pictures can be compressed greatly since interframe prediction is performed by catching only the moving picture varying between frames.

As standards for a videophone apparatus, there are H.324 Video Conference System software of ITU recommendations, H.263 Video, H.223 Multiplex, H.245 Protocol, G.723 Audio and the like. Compression techniques, software, and communications protocols are preferably pursuant to these standards.

Either of a normal analog line and a digital line such as INS can be used as a communications infrastructure. The transmission speed in the analog line is currently about 28.8 Kbps, and it is said that a 1.5-Mbps modem adopting an ADSL (Asymmetric Digital Subscriber Line) technique will be generalized in homes as a next-generation one in about 1999 or 2000 without any extra investment, thought its transmission speed is not so high. It will still take much time to develop the communications infrastructure. The next-generation modem allows not only high-speed access of the Internet but also transfer of pictures of ten to fifty times higher quality than that of pictures of the currently-used videophone; therefore, a coincidence of lines of sight is essential to such a videoconference system.

It is said that after 2000 up 6M to 8M communications of full-scale ADSL can be allowed even by the use of the present analog line though a so-called POTS splitter is required for each home. Thus, the current MPEG-1-level (VHS-level) picture can be transferred.

The Alpha Project is being carried out in which optical fibers will be constructed near individual households in about 2005 to 2010 and accordingly a communication line of about 15 Mbps will be installed in each household. It is thus thought that the current MPEG-2 fine moving picture is used for a videophone and a coincidence of lines of sight becomes essential. In this case, too, it is hard to think that a large-scale computer or a large-screen television is used as a videophone. A small-sized videophone of the present invention is thus needed to be smaller than the currently-used telephone.

[Second Embodiment]

FIG. 4 illustrates an outward appearance of a videophone apparatus according to a second embodiment of the present invention. The second embodiment is directed to a small-sized portable videophone having a radio communications function, and its basic constitution is almost equal to that of the apparatus shown in FIG. 3. As in the first embodiment, a large display screen is achieved using a small-sized LCD and a coincidence of lines of sight is attained in the videophone apparatus.

The small-sized portable videophone 60 includes an antenna 61, a case 62, an operation switch 63, a display window 64, a speaker 65, and a microphone 66.

The optical system, which is encased in the case 62, is basically the same as that illustrated in FIG. 1. In the case of a portable telephone, a distance between a display window and user's eyes is set in the neighborhood of 15 cm, and the curvature of a reflector 7 of a free-form surface prism 1 is varied with the distance. The prism 1 needs to be decreased in size and weight.

Currently there are a cellular phone and a PHS (Personal Handy Phone system) as a radio communications infrastructure. The cellular phone has a considerably low transmission speed of 9.8 Kbs, whereas the PHS allows 32-K data communications. In such a portable telephone, an experiment in W-CDMA will be carried out in about 2000 and a 384-Kbit transmission speed will be achieved in about 2002. It is thus expected that a moving picture of very high quality can be transferred. Moreover, compact HTML and WML (Wireless Markup Language) as a markup language of contents for a personal digital assistant, can be browsed in a 150×100 display, and so can be the Internet.

It is said that an MMAC (Multimedia Mobile Access Communication) system will be put to practical use as a next-generation PHS after 2002 up. In this system, the baseband in the outdoor base station is 3–60 G to allow 25-Mbps communications. If this system is realized, even a portable telephone can be used as a videophone, and an adequate-quality picture of MPEG-2 can be transmitted bidirectionally. In this case, a coincidence of lines of sight is essential. Since, furthermore, a cordless phone is popularized in average homes, the MMAC system can be applied to a small-sized wireless videophone.

[Third Embodiment]

Figures 5A, 5B:
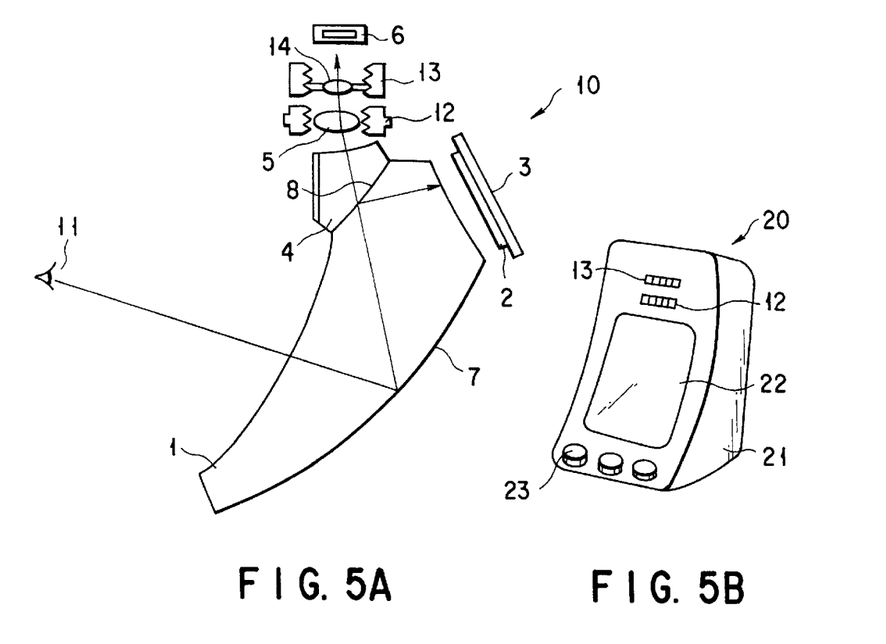
FIG. 5A shows an optical system of the videophone apparatus and FIG. 5B shows an outward appearance of the videophone apparatus.

FIG. 5A shows an optical system which is a basic constituent of a videophone apparatus according to a third embodiment of the present invention. The optical system and the apparatus constitution are almost equal to those of the first embodiment. As in the first embodiment, a large display screen can be achieved using a small-sized LCD and a coincidence of lines of sight can be attained in the videophone apparatus.

The optical system 10 comprises a free-form surface prism 1, a display 2, such as an LCD, for displaying an image, a backlight 3 for illuminating the display 2, a camera 6 such as a CCD sensor and a CMOS sensor, a prism 4 for guiding light to the camera 6, and a lens 5 arranged between the prism 4 and camera 6.

The free-form surface prism 1 includes a reflector 7 for forming an image, which corresponds to the picture displayed on the display 2, in space. A beam splitter 8 is provided on the bonded surface between the free-form surface prism 1 and prism 4 to reflect some of light beams from the display 2 toward the reflector 7 and transmit some of light beams reflected by the reflector 7.

The optical system 10 also includes a zoom lens 14 for varying a magnification between the lens 5 and camera 6, a ring-shaped focus adjustment dial 12 which allows adjustment of focus by rotation, and a ring-shaped zoom adjustment dial 13 which allows change of magnification by rotation.

The apparatus has a magnification, which depends upon a distance to user's eyes and an angle of view for display by its own optical design. In general, the magnification is not changed greatly, and its focus is adjusted by moving a user's head. However, there is a case where a user wishes to vary the focus and magnification of the camera. After the position of the user's eyes is determined in consistency with a display position, neither the focus nor the angle of view might be obtained exactly. If therefore a decentered free-form surface prism is employed, the camera can be disposed on the side thereof very conveniently. A wide angular range of view is the most suitable for a situation which some people join in a conversation.

FIG. 5B illustrates an outward appearance of a videophone apparatus 20 including the optical system of FIG. 5A. The videophone apparatus 20 has a case 21 for encasing the optical system, and a display window 22 and an operation button 23 both provided on the case 21. The focus adjustment dial 12 and zoom adjustment dial 13 are exposed to the surface of the case 21 to allow the focus and magnification to be easily adjusted.

[Fourth Embodiment]

Figures 6A, 6B:
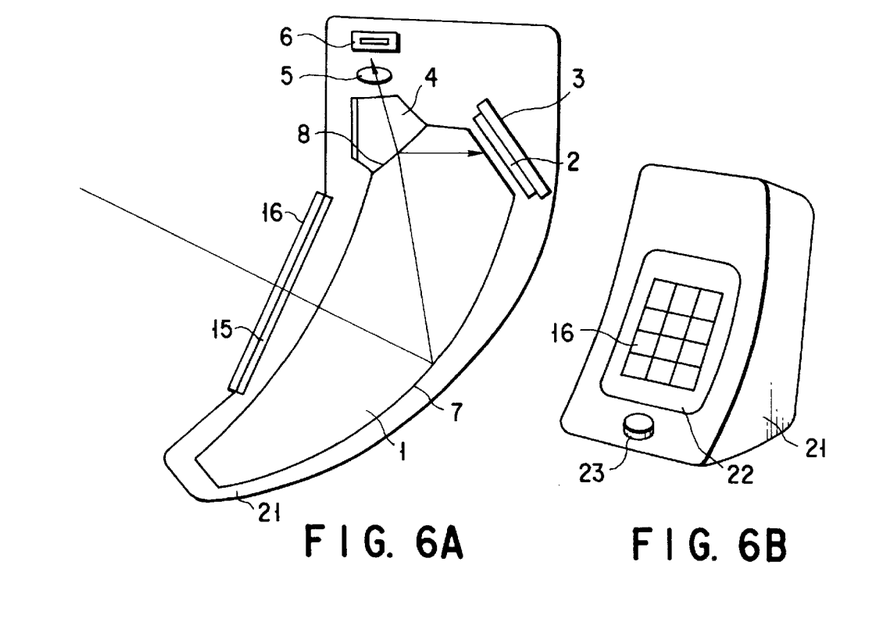
FIG. 6A is a side-sectional view of the videophone apparatus and FIG. 6B shows an outward appearance of the videophone apparatus.

FIG. 6A is a side-sectional view of a videophone apparatus according to a fourth embodiment of the present invention, and FIG. 6B illustrates an outward appearance of the videophone apparatus. The optical system and the constitution of the apparatus are almost equal to those of the first embodiment. Therefore, as in the first embodiment, a large display screen can be achieved using a small-sized LCD and a coincidence of lines of sight can be attained in the videophone apparatus.

The videophone apparatus comprises a free-form surface prism 1, a display 2, such as an LCD, for displaying an image, a backlight 3 for illuminating the display 2, a camera 6 such as a CCD sensor and a CMOS sensor, a prism 4 for guiding light to the camera 6, and a lens 5 arranged between the prism 4 and camera 6.

The free-form surface prism 1 includes a reflector 7 for forming an image, which corresponds to the picture displayed on the display 2, in space. A beam splitter 8 is provided on the bonded surface between the free-form surface prism 1 and prism 4 to reflect some of light beams from the display 2 toward the reflector 7 and transmit some of light beams reflected by the reflector 7.

A case 21, which surrounds the above optical elements, has a display window 22 and an operation button 23 on the front thereof. The display window 22 comprises a transparent window 15 and a touch panel 16. The touch panel 16 comprises a contact sensor or a pressure sensor which is made of a transparent thin-film electrode such as ITO (InTiO$_3$) and a nesa-thin-film and intended for outputting the coordinates of a spot that a user touches with the finger or a pen and using the coordinates information in place of a key.

Since the optical system forms a virtual image of the LCD in a position of user's eyes, it has the advantage that even though the touch panel gets fingerprints on it, an image simply becomes somewhat dark and its quality is hardly degraded. Since, moreover, most input operations are performed by the touch panel 16, the number of operation buttons can be decreased.

[Fifth Embodiment]

Figures 7A, 7B:
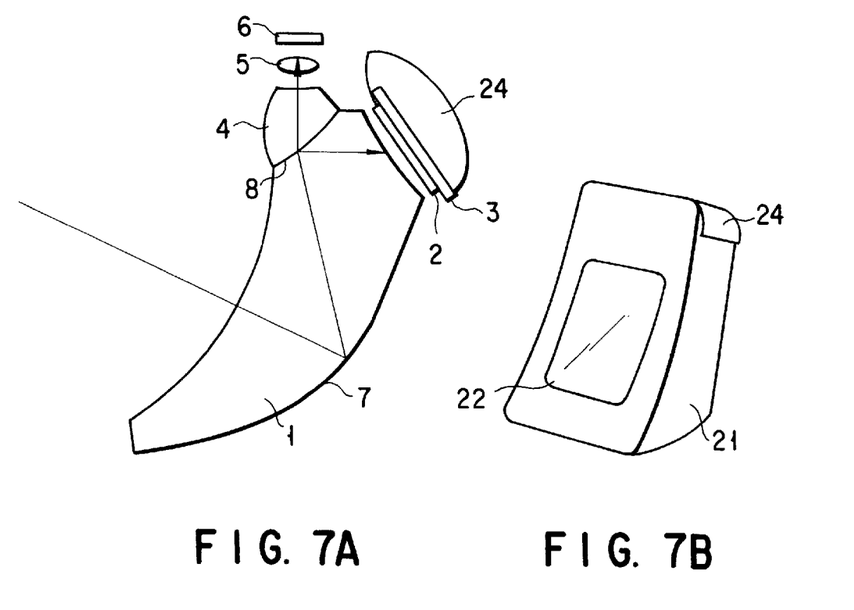
FIG. 7A shows an optical system of the videophone apparatus and FIG. 7B shows an outward appearance of the videophone apparatus.

FIG. 7A shows an optical system of a videophone apparatus according to a fifth embodiment of the present invention, and FIG. 7B illustrates an outward appearance of the videophone apparatus. The optical system and the constitution of the apparatus are almost equal to those of the first embodiment. Therefore, as in the first embodiment, a large display screen can be achieved using a small-sized LCD and a coincidence of lines of sight can be attained in the videophone apparatus.

The optical system comprises a free-form surface prism 1, a display 2, such as an LCD, for displaying an image, a backlight 3 for illuminating the display 2, a camera 6 such as a CCD sensor and a CMOS sensor, a prism 4 for guiding light to the camera 6, and a lens 5 arranged between the prism 4 and camera 6.

The free-form surface prism 1 includes a reflector 7 for forming an image, which corresponds to the picture displayed on the display 2, in space. A beam splitter 8 is provided on the bonded surface between the free-form surface prism 1 and prism 4 to reflect some of light beams from the display 2 toward the reflector 7 and transmit some of light beams reflected by the reflector 7.

A beam-condensing prism 24 is provided behind the backlight 3 and on the upper part of the case 21. The surface of the prism 24 has microscopic asperities for causing a scattering of light.

When the apparatus is in a lighted location, external light is supplied to the display 2 uniformly thanks to the microscopic asperities of the prism 24. When it is still light enough outside, the backlight 3 need not be used. In using the apparatus in the daytime, the display 2 can be decreased in power consumption and increased in brightness.

[Sixth Embodiment]

Figure 8:
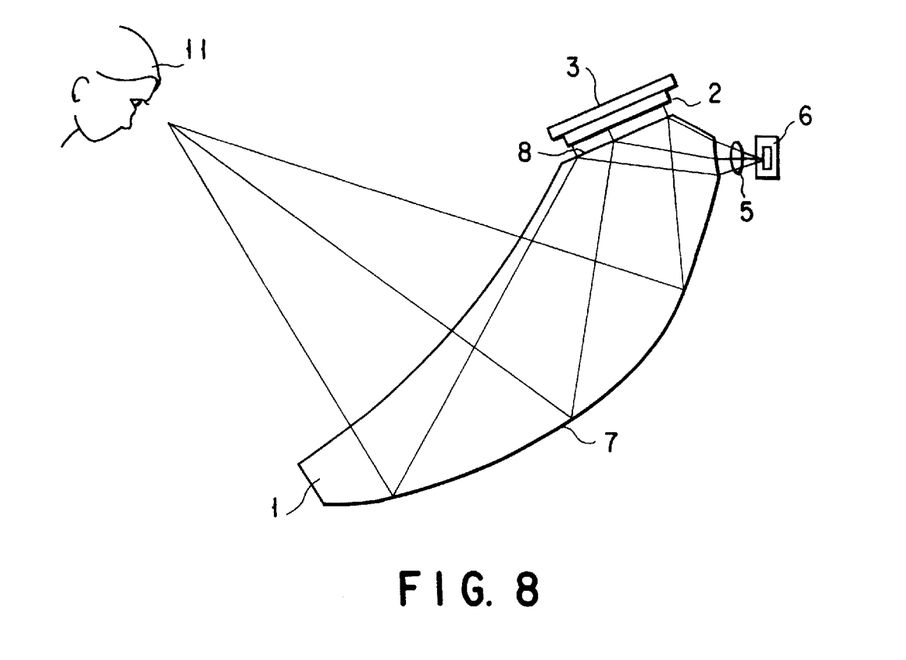
FIG. 8 shows an optical system of a videophone apparatus according to a sixth embodiment of the present invention.

FIG. 8 shows an optical system 10 of a videophone apparatus according to a sixth embodiment of the present invention. The optical system 10 comprises a free-form surface prism 1, a display 2, such as an LCD, for displaying an image, a backlight 3 for illuminating the display 2, a camera 6 such as a CCD sensor and a CMOS sensor, and a lens 5 arranged between the prism 1 and camera 6.

The free-form surface prism 1 includes a reflector 7 and a beam splitter 8. The beam splitter 8 is provided opposite to the display 2 to transmit some of light beams from the display 2 toward the reflector 7 and then reflect some of light beams reflected by the reflector 7 toward the lens 5. The reflector 7 forms an image, which corresponds to the picture displayed on the display 2, in space.

The display 2, backlight 3, beam splitter 8 and reflector 7 constitute a display system, while the camera 6, lens 5, prism 4, beam splitter 8 and reflector 7 constitute a camera system.

The optical axes or optical paths of the display and camera systems coincide with each other after the beam splitter 8 with each of the display 2 and camera 6 as a starting point. Consequently, a coincident of lines of sight can be achieved in the videophone apparatus.

The optical system may further comprises an infrared filter or a low-pass filter if necessary.

In the optical system shown in FIG. 8, some of the light beams of a picture (usually a color picture) displayed on the display 2 pass through the beam splitter 8 or the light beams fall upon the free-form surface prism 1 with a slight loss. The light beams incident upon the prism 1 are reflected by the reflector 7 and then exit from the prism 1 to form an image in space. The picture of the display 2 is enlarged and projected on the reflector 7. The reflector 7 is curved and optically enlarges the picture projected thereon. Consequently, an about-1-inch screen of the display 2 is enlarged and the picture is observed by a user 11.

The light beams incident upon the free-form surface prism 1 from the user 11, are reflected by the reflector 7, and some of them are reflected by the beam splitter 8 to form an image on the light-receiving surface of the camera 6 by means of the lens 5. An image of the user 11 is therefore picked up by the camera 6.

The number of parts of the optical system in the sixth embodiment is smaller than that in the first embodiment. Consequently, a videophone apparatus can be manufactured at low cost.

[Seventh Embodiment]

Figure 9:
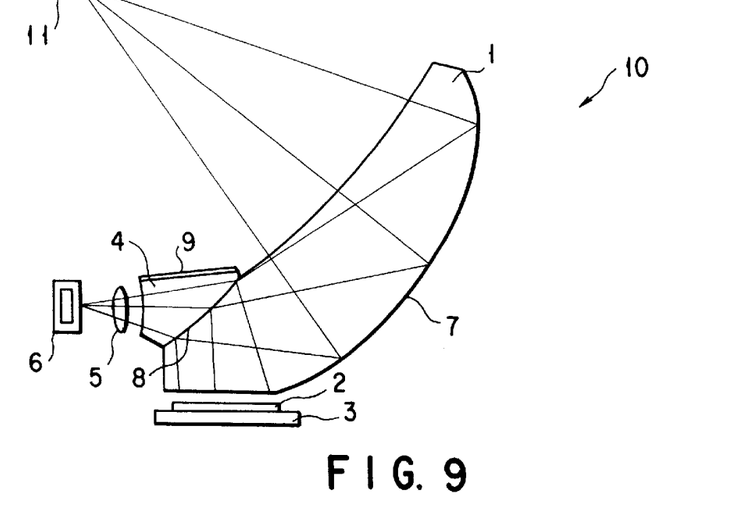
FIG. 9 shows an optical system of a videophone apparatus according to a seventh embodiment of the present invention.

FIG. 9 illustrates an optical system 10 of a videophone apparatus according to a seventh embodiment of the present invention. The optical system and the constitution of the apparatus are almost equal to those of the first embodiment. Therefore, as in the first embodiment, a large display screen can be achieved using a small-sized LCD and a coincidence of lines of sight can be attained in the videophone apparatus.

The optical system 10 comprises a free-form surface prism 1, a display 2, such as an LCD, for displaying an image, a backlight 3 for illuminating the display 2, a camera 6 such as a CCD sensor and a CMOS sensor, a prism 4 for guiding light to the camera 6, and a lens 5 arranged between the prism 4 and camera 6.

The free-form surface prism 1 has a reflector 7 for forming an image, which corresponds to the picture displayed on the display 2, in space through a display window of a case (not shown). A beam splitter 8 is provided on the bonded surface between the free-form surface prism 1 and prism 4 to reflect some of light beams from the display 2 toward the reflector 7 and transmit some of light beams reflected by the reflector 7. The prism 4 also includes a light-shield section 9.

In the optical system 10, the display 2 and backlight 3 are located under the free-form surface prism 1, and the lens 5 and camera 6 are located relatively lower. The barycenter of all optical parts for constituting the optical system 10 is therefore low. In the near future, such a constitution will allow high-speed data communications over the telephone line and will therefore be suitable for a large-sized display.

[Eighth Embodiment]

Figure 10:
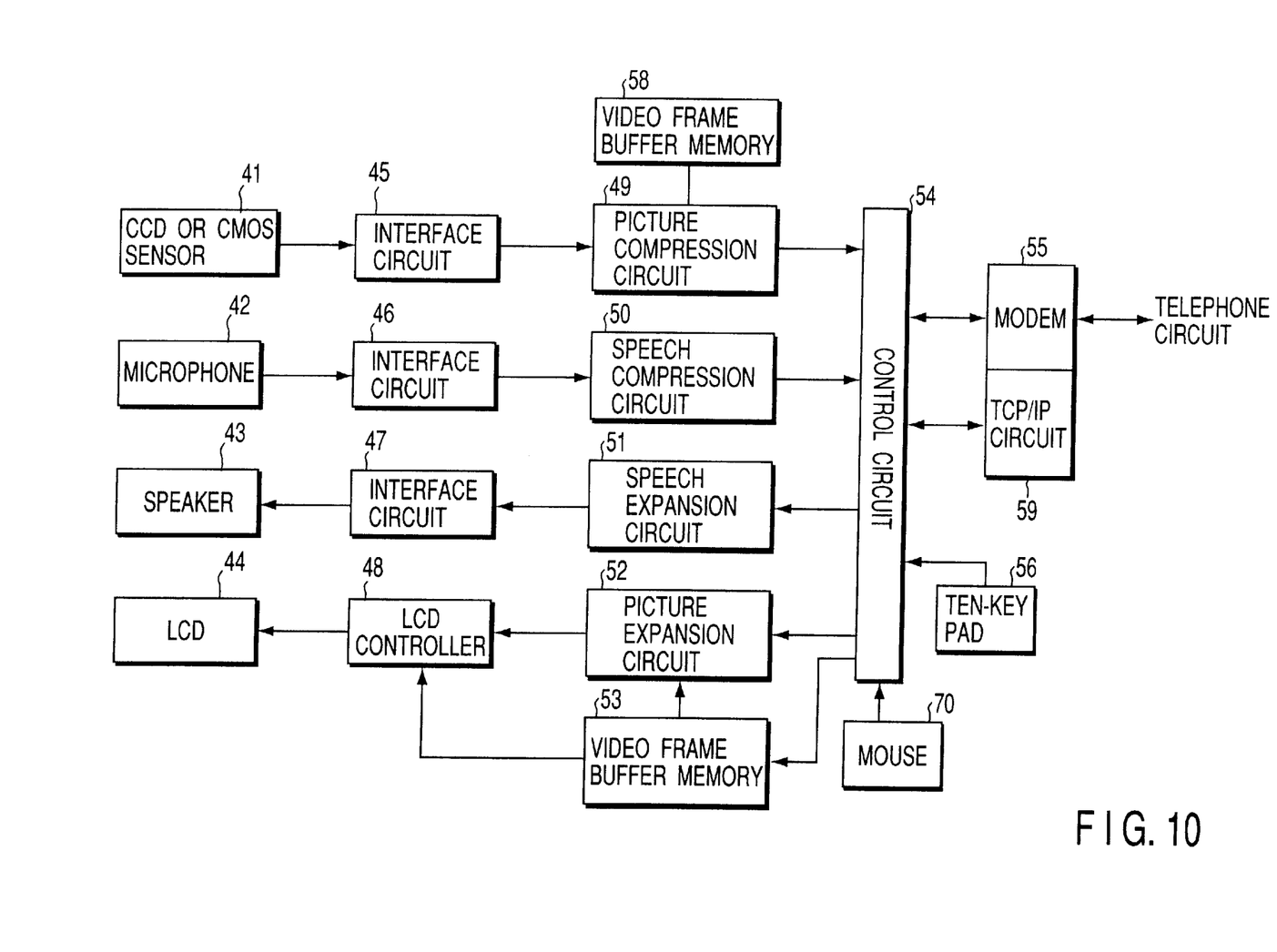
FIG. 10 shows a constitution of a videophone apparatus having a function of a communications terminal according to an eighth embodiment of the present invention.

FIG. 10 illustrates a constitution of a videophone apparatus according to an eighth embodiment of the present invention. The videophone of the eighth embodiment has a function of a communications terminal capable of browsing the Internet and sending/receiving e-mail.

The videophone apparatus comprises a CCD or CMOS sensor 41, an interface circuit 45 such as an amplifier and an ADC, and a picture compression circuit 49, for inputting a picture; a microphone 42, an interface circuit 46 such as an amplifier and an ADC, and a speech compression circuit or DSP 50, for inputting speech; a picture expansion circuit 52, an LCD controller 48, and an LCD 44, for outputting a picture; a speech expansion circuit 51, an interface circuit 47 such as an amplifier, and a speaker 43, for outputting speech. The videophone apparatus may further comprises a video frame buffer memory 58 for compressing and expanding a picture and a video frame buffer memory 53 for temporarily storing a picture. A control circuit 54 for controlling whole of the circuits is connected to a telephone circuit through a modem 55 and controlled by a ten-key pad 56. A bus line is used for each data line when necessary. The apparatus further comprises a PCT/IP circuit 59 necessary for PCT communications and a mouse 70 if necessary. Some of these circuits are mounted on a semiconductor chip as a system-on-chip.

The apparatus is capable to the Internet by preparing a browser for browsing a text such as an HTML (Hyper Text Markup Language), a function of browsing a picture file such as a GIF (Graphics Interface Format), and software capable of recognizing a language such as Java and VRML (Virtual Reality Markup Language).

The apparatus is capable to the E-mail by preparing a mail software. Since the microphone and DSP are built into the apparatus, a mail text can be prepared by a speech recognition apparatus and then transmitted.

[Ninth Embodiment]

Figures 11A, 11B, 11C:
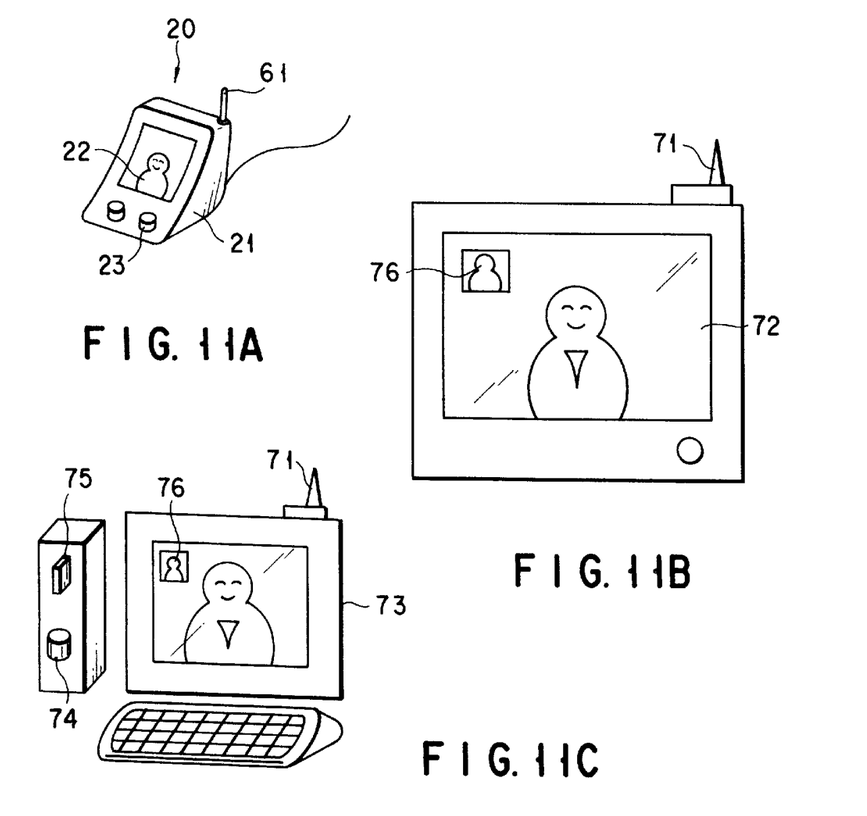
FIG. 11A shows a personal videophone apparatus used in the system.
FIG. 11B shows a home television used in the system.
FIG. 11C shows a personal computer used in the system.

A ninth embodiment is directed to a concept in which a picture received by a personal videophone apparatus is seen by a family on home television or processed by a personal computer. FIG. 11A illustrates a personal videophone apparatus 20, FIG. 11B shows a home TV set 72, and FIG. 11C shows a personal computer 73.

As illustrated in FIG. 11A, the personal videophone apparatus 20 comprises an antenna 61 for radio data communications or wireless LAN. A user speaks while seeing a display window 22, with a coincidence of lines of sight.

As shown in FIG. 11B, the home TV set 72 has an antenna 71 for radio data communications or wireless LAN. In order for a user to look at the party on the other end of the phone together with his family, a picture signal is transmitted from the apparatus 20 to the TV set 72 by radio. The TV set 20 converts the received picture signal to an NTSC signal to display a picture. A sub-screen 76 of the transmitting side may be displayed together with the picture. The sub-screen 76 is favorably inserted in the screen of the TV set 72 in response to a signal from the videophone apparatus 20.

As shown in FIG. 11C, the personal computer 73 comprises an antenna 71 for radio data communications or wireless LAN. The computer 73 also comprises a high-speed CPU 75 and a large-capacity hard disk 74. The videophone apparatus 20 transmits a picture signal to the computer 73 by radio data communications or wireless LAN, and the computer 73 converts the received picture signal to an adequate signal to display a picture. A sub-screen 76 of the transmitting side may be displayed together with the picture.

The computer 73 may carry out some functions using the CPU 75 and hard disk 74 if necessary. For example, speech of a microphone of the videophone apparatus 20 or a digitized speech signal is transmitted to the computer 73 by radio and decoded by the CPU 75 referring to a large amount of intellectual database, and the result is returned to the apparatus 20 by radio. A home computer need not be used for the speech recognition. It can be replaced with a provider's computer and a computer installed in a center of a carrier (a communications company).

In this embodiment, a wire LAN as well as the above wireless LAN may be used.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display and camera device for a videophone comprising:

display means for displaying a picture;

camera means for picking up an image;

optical path separation means for separating (i) a display-system optical path extending from the display means toward an outside space and (ii) a camera-system optical path extending from the outside space toward the camera means, so that the display system optical path and the camera-system optical path coincide with each other toward the outside space from the optical path separation means, and so that the display system optical path and the camera-system optical path differ from each other from the optical path separation means to the display means and the camera means; and optical means, arranged nearer to the outside space than the optical path separation means, for enlarging the picture displayed on the display means;

wherein an optical power of the optical means used to enlarge the picture displayed on the display means is also used by the camera means for effecting an image pick up operation.

2. A display and camera device according to claim 1, wherein the optical means comprises a concave optical reflection plane which generates the optical power.

3. A display and camera device according to claim 1, wherein the optical means comprises a free-form surface prism.

4. A display and camera device according to claim 1, wherein the optical element comprises a concave optical reflection plane which generates the optical power.

5. A display and camera device according to claim 1, wherein the optical element comprises a free-form surface prism.

6. A display and camera device for a videophone comprising:
   a display that displays a picture;
   a camera that picks up an image;
   an optical path separation surface that separates (i) a display-system optical path extending from the display toward an outside space and (ii) a camera-system optical path extending from the outside space toward the camera, so that the display-system optical path and the camera-system optical path coincide with each other toward the outside space from the optical path separation surface, and so that the display-system optical path and the camera-system optical path differ from each other from the optical path separation surface to the display and the camera; and
   an optical element that enlarges the picture displayed on the display, said optical element being arranged nearer to the outside space than the optical path separation surface;
   wherein an optical power of the optical element used to enlarge the picture displayed on the display is also used by the camera for effecting an image pick up operation.

7. A display and camera device for a videophone comprising:
   a display system that forms a picture in an outside space, the display system including a picture display;
   a camera system that picks up an image from the outside space, the camera system including a camera;
   an optical path separation surface that separates a display-system optical path and a camera-system optical path from each other, so that the display-system optical path and the camera-system optical path coincide with each other in the outside space, and so that the display-system optical path and the camera-system optical path differ from each other beside the picture display and the camera; and
   an optical element that enlarges the picture formed by the display system, said optical element being arranged nearer to the outside space than the optical path separation surface;
   wherein an optical power of the optical element used to enlarge the picture formed by the display system is also used by the camera system for effecting an image pick up operation.

8. A display and camera device according to claim 7, wherein the display system and the camera system comprise a common free-form surface prism.

9. A display and camera device according to claim 8, wherein the optical element comprises a concave reflection plane provided on the free-form surface prism.

10. A display and camera device according to claim 8, wherein the optical path separation surface comprises a surface of the free-form surface prism.

11. A videophone apparatus comprising:
    a display system having a display;
    a camera system having a camera;
    an optical instrument having a free-form surface prism, said optical instrument being adapted to split an optical path of the display system, enlarge a picture displayed by the display system, separate the display system and camera system from each other, and correct an aberration of the camera system;
    an optical path separating surface included in the optical instrument, said optical path separation surface being arranged to separate (i) a display system optical path extending from the display toward an outside space and (ii) a camera-system optical path extending from the outside space toward the camera, so that the display system optical path and the camera-system optical path coincide with each other toward the outside space from the optical path separation surface, and so that the display system optical path and the camera-system optical path differ from each other from the optical path separation surface to the display and the camera; and
    a signal processing circuit that processes a signal of the picture displayed by the display system and a signal of an image picked up by the camera system.

12. A videophone apparatus according to claim 11, wherein the optical instrument comprises a decentered free-form surface prism.

13. A videophone apparatus according to claim 11, wherein the optical instrument comprises two free-form surface prisms, and the display is arranged close to one of the free-form surface prisms, while the camera is arranged close to the other free-form surface prism.

14. A videophone apparatus according to claim 13, wherein the optical instrument comprises a beam splitter on a bonded surface between the two free-form surface prisms.

15. A videophone apparatus according to claim 11, wherein the optical instrument comprises two reflection planes between an outside space and the display.

16. A videophone apparatus according to claim 15, wherein at least one of the reflection planes reflects light toward the outside space and comprises a mirror.

17. A videophone apparatus according to claim 11, wherein the display and the camera are both located above an area where the picture displayed by the display system is to be projected.

18. A videophone apparatus according to claim 11, further comprising a picture compression circuit that compresses the picture displayed by the display system, a picture expansion circuit that expands the picture displayed by the display system, and a control circuit for controlling the picture compression and picture expansion circuits.

19. A videophone apparatus according to claim 11, wherein the apparatus further comprises a high-frequency modulation circuit and a high-frequency demodulation circuit, and the apparatus comprises a portable telephone equipped with an antenna.

20. A videophone apparatus according to claim 11, further comprising a lens arranged between the camera and the optical instrument, and a focus adjustment mechanism that adjusts a focus by varying a distance between the camera and the lens.

21. A videophone apparatus according to claim 11, further comprising a zoom lens arranged between the camera and the optical instrument, and a magnification adjustment mechanism that adjusts a magnification by varying a distance between the camera and the zoom lens.

22. A videophone apparatus according to claim 11, further comprising a case that encases the apparatus, and a transparent plate that is one of formed integrally with the case as one component and adhered thereto, said transparent plate being arranged beside an outside space to protect the optical instrument.

23. A videophone apparatus according to claim 22, further comprising a two-dimensional pressure sensor adapted to be used in a touch panel arranged on the transparent plate.

24. A videophone apparatus according to claim 11, wherein the display comprises a backlight surface, and the apparatus further comprises a beam-condensing prism arranged on the backlight surface.

25. A videophone apparatus according to claim 11, wherein the optical instrument comprises a single decentered free-form surface prism.

26. A videophone apparatus according to claim 11, wherein the display and the camera are both located below an area where the picture displayed by the display system is to be projected.

27. A videophone apparatus according to claim 11, further comprising a storage device that stores an identification number specific to the apparatus, so that the storage device may be used as a communications terminal.

28. A videophone apparatus according to claim 11, wherein the apparatus is adapted to be connected to at least one of a home television and a home computer by at least one of radio and wire and to transmit a received picture to said at least one of the home television and home computer so that the picture can be simultaneously seen on said at least one of the home television and the home computer.

29. A videophone apparatus according to claim 11, wherein the apparatus further comprises a microphone that acquires a speech signal, and the apparatus is adapted to be connected to a computer by at least one of radio and wire so that the apparatus can transmit the speech signal to the computer for speech recognition and receive from the computer characters corresponding to a recognized speech.

* * * * *